(12) United States Patent
Higgin

(10) Patent No.: US 10,625,600 B2
(45) Date of Patent: Apr. 21, 2020

(54) FUEL TANK VAPOR SUPPRESSION DEVICES

(71) Applicant: Ford Global Technologies LLC, Dearborn, MI (US)

(72) Inventor: Graham Higgin, Torquay (AU)

(73) Assignee: Ford Global Technologies LLC, Dearborn, MI (US)

( * ) Notice: Subject to any disclaimer, the term of this patent is extended or adjusted under 35 U.S.C. 154(b) by 178 days.

(21) Appl. No.: 15/887,696

(22) Filed: Feb. 2, 2018

(65) Prior Publication Data

US 2018/0229600 A1   Aug. 16, 2018

(30) Foreign Application Priority Data

Feb. 14, 2017   (CN) .......................... 2017 1 0080040

(51) Int. Cl.
| | | |
|---|---|---|
| *B60K 15/035* | (2006.01) | |
| *B60K 15/04* | (2006.01) | |
| *F02M 25/08* | (2006.01) | |
| *B60K 16/00* | (2020.01) | |

(52) U.S. Cl.
CPC ........ *B60K 15/03504* (2013.01); *B60K 15/04* (2013.01); *B60K 2015/03514* (2013.01); *B60K 2015/03557* (2013.01); *B60K 2016/006* (2013.01); *F02M 25/089* (2013.01); *F02M 25/0836* (2013.01)

(58) Field of Classification Search
CPC .............. B60K 15/03504; B60K 15/04; B60K 2015/03514; B60K 2015/03236; F02M 25/0836; F02M 25/089

USPC ....................................................... 141/350
See application file for complete search history.

(56) References Cited

U.S. PATENT DOCUMENTS

| | | | |
|---|---|---|---|
| 4,919,103 A | 4/1990 | Ishiguro et al. | |
| 5,255,735 A | 10/1993 | Raghava et al. | |
| 6,000,426 A * | 12/1999 | Tuckey ............... | B60K 15/035 123/516 |
| 6,065,507 A | 5/2000 | Nanaji | |
| 6,206,057 B1 | 3/2001 | Benjey et al. | |
| 6,807,925 B1 | 10/2004 | Lesage | |
| 6,807,952 B1 | 10/2004 | Amellal et al. | |
| 8,961,660 B2 | 2/2015 | Ogawa | |
| 9,393,863 B2 | 7/2016 | Topolovec et al. | |
| 2003/0140970 A1 | 7/2003 | Benjey | |
| 2013/0008899 A1* | 1/2013 | Hisadomi ............. | B60K 15/03 220/86.2 |

OTHER PUBLICATIONS http://www.agcoauto.com/content/news/p2_articleid/242.

* cited by examiner

*Primary Examiner* — P. Macade Nichols
(74) *Attorney, Agent, or Firm* — Geoffrey Brumbaugh; Kolitch Romano LLP

(57) ABSTRACT

A fuel vapor suppression system in a fuel tank in a vehicle comprises a fuel storage compartment, an opening, an inlet check valve in the opening connected to a fuel filler pipe, and a vapor suppression device disposed in the fuel storage compartment and connected with the inlet check valve. The vapor suppression device may include a cylindrical mesh body having a pore size of no less than 1 mm.

19 Claims, 7 Drawing Sheets

FUEL TANK VAPOR SUPPRESSION DEVICES

RELATED APPLICATION

This application claims the benefit of Chinese Patent Application No.: CN 201710080040.5 filed on Feb. 14, 2017, the entire contents thereof being incorporated herein by reference.

FIELD

The present disclosure relates generally to fuel vapor suppression devices. In particular, it relates to vapor suppression devices for vehicle fuel tanks.

BACKGROUND

Fuel tank vapor suppression devices reduce the amount of fuel that escapes from a tank as vapor when a user fills the tank with fuel. Because environmental concerns and government regulations aim to reduce air emissions, manufacturers have adopted various means to reduce the escape of fuel vapors, such as by directing them to the engine for combustion or to canisters with carbon that adsorb vapors.

Suppressing the amount of fuel vapor created upon refueling reduces the work needed to control vapors and improves the performance of carbon adsorption media in a canister in the fuel system. One means of suppressing fuel vapor creation is to mechanically disperse the force of liquid fuel entering the fuel tank. Known vapor suppression devices are not entirely satisfactory for the range of applications in which they are employed. For example, some fuel systems use a filter media disposed in the fuel tank to reduce vapor resulted from fuel refilling. However, the size and configuration of these vapor reduction devices can significantly restrict the fuel flow and affect the operation of the fuel system.

SUMMARY

A vapor suppression device for suppressing the generation of fuel vapors when liquid fuel is pumped into a fuel tank of a vehicle is described. According to one aspect, a vehicle fuel tank may include an inlet check valve and a vapor suppression device. The fuel tank includes a fuel storage compartment with an opening, an inlet check valve disposed on the opening and connected to a fuel filler pipe, and a vapor suppression device. The vapor suppression device includes an inlet end coupled to the inlet check valve, an outlet end, and a hollow cylindrical body in between. The outlet end is spaced apart from the fuel tank bottom, and the hollow cylindrical body includes a mesh portion with a pore size of at least 1 mm. In one embodiment, the mesh portion may include pores in a range of about 1.0 mm to 1.5 mm in size.

In one embodiment, the vapor suppression device length is in a range of about 100 mm to about 150 mm. In another embodiment, the inlet end of the vapor suppression device includes a collar that snap-fits to a body of the inlet check valve. In another embodiment, the inlet end is coupled to the inlet check valve by a plastic tie strap. In another embodiment, the hollow cylindrical body is closed off at the outlet end.

In another embodiment, the hollow cylindrical body includes a sidewall and a bottom wall, with the mesh portion including both a mesh on the sidewall and a mesh on the bottom wall. A magnetic ring may be coupled to the bottom wall.

According to another aspect, a vapor suppression device is disposed in a fuel tank. The vapor suppression device has an outlet end spaced apart from the fuel tank bottom, an inlet end configured to couple on a fuel inlet check valve, and a hollow cylindrical body including a mesh portion. In one embodiment, the mesh portion is about 0.3 mm thick. In another embodiment, the mesh portion may include pores no less than 1 mm in size. In another embodiment, the mesh portion may include pores in a range of about 1.0 mm to 1.5 mm in size.

In another embodiment, the cylindrical body includes a sidewall and a bottom wall at the outlet end. The sidewall may include a first mesh and the bottom wall includes a second mesh. The pore size of the first mesh may be greater than the pore size of the second mesh.

In another embodiment, a magnetic ring may be coupled to the bottom wall.

According to another aspect of the invention, a fuel tank in a vehicle may comprise an inlet check valve disposed on an opening of the fuel tank and connected to a fuel filler pipe; and a vapor suppression device disposed in the fuel tank. The vapor suppression device includes an inlet end coupled to the inlet check valve, an outlet end, and a mesh cylindrical body with the outlet end pinched together. The outlet end of the vapor suppression device is spaced apart from a bottom of the fuel tank.

In one embodiment, at least a portion of the mesh cylindrical body has pore size no less than 1 mm.

In another embodiment, the pore of the mesh cylindrical body is of substantially square shape.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below.

DETAILED DESCRIPTION

The disclosed fuel tank vapor suppression system will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, examples of fuel tank vapor suppression system are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
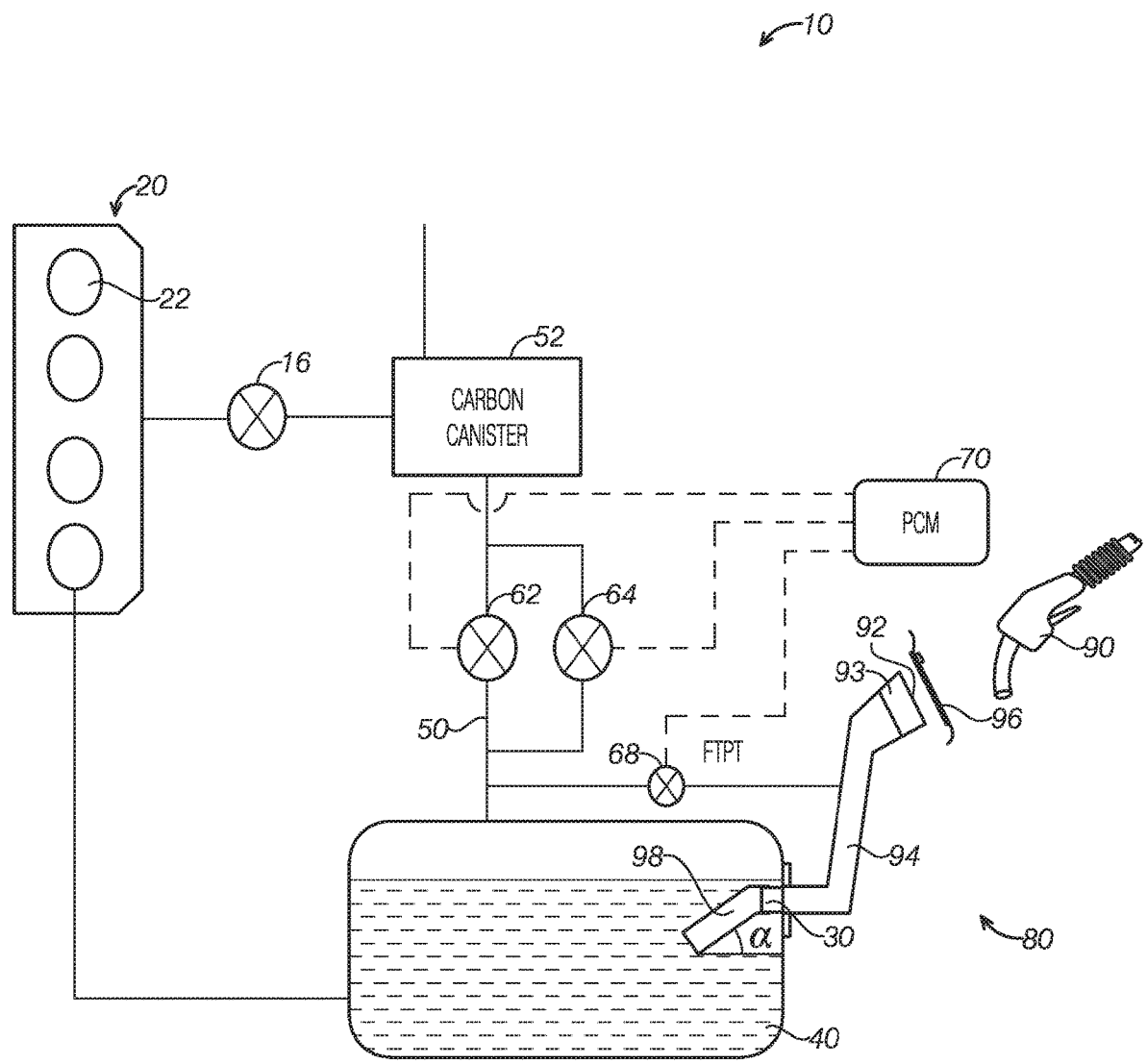
FIG. 1 schematically illustrates an example fuel system in a vehicle.

FIG. 1 schematically illustrates an example fuel system 10 in a vehicle. The fuel system 10 may include an engine 20 having multiple cylinders 22. Engine 20 is fluidly communicated with a fuel tank 40 and intake fuel via one or more pumps. In some embodiments, fuel system 10 may include a fuel vapor recovery system including fuel vapor path 50 and carbon canister 52. Fuel system 10 includes fuel tank 80. Fuel tank 80 includes fuel storage compartment 40 and inlet check valve 30. Vapor generated from fuel storage compartment 40 may be guided to fuel vapor recovery path 50 and carbon canister 52 and then adsorbed on carbon in the carbon canister. Fuel vapor recovery path 50 may include fuel vapor valves 62 and 64 selectively connected or disconnected to fuel storage compartment 40 for fuel vapor recovery. Further, carbon canister 52 may be connected to engine 20 via canister recovery valve 16 so that the recovered fuel vapor is purged to engine 20 for combustion. Canister recovery valve 16 may be an open valve so that the purging rate may be adjusted by the valves 62 and 64 upstream of carbon canister 52. Canister 52 may have an opening to discharge the filtered air to the atmosphere. In addition, valves between fuel storage compartment 40 and carbon canister 52 may maintain suitable pressure in carbon canister 52 and fuel storage compartment 40 so that an amount of vapor from fuel storage compartment 40 is not increased. For example, valves 62 and 64 may control a flowrate of fuel in fuel vapor recovery path 50 to allow fuel vapor recovery at different pressure conditions at fuel storage compartment 40. The vehicle may further include control module 70 to obtain information from various sensors and activate control devices such as valves. In the depicted embodiment, the fuel system 10 may include a fuel tank pressure sensor 68 to measure the vapor pressure in the tank 80.

In some embodiments, fuel tank 80 may include a fuel inlet 92 to receive a refuel filler 90 and a filler pipe 94 disposed between the fuel inlet 92 and an opening on the fuel tank body. An inlet check valve 30 may be disposed on the opening and connected with filler pipe 94. In some embodiments, a seal 93 may be disposed on fuel inlet 92. FIG. 1 also shows a refuel door 96 on a vehicle body.

In some embodiments, a vapor suppression device 98 may be disposed in fuel storage compartment 40. Vapor suppression device 98 reduces the vapor generated when refueling, which can improve the performance of carbon canister 52 and allow for the use of low cost carbon in carbon canister 52. FIG. 1 shows that the vapor suppression device 98 is disposed at an angle α relative to a bottom of the fuel storage compartment 40. It should be appreciated that the vapor suppression device 98 may be disposed at any suitable angles. Example embodiments of a vapor suppression device will be described below.

Figure 2A:
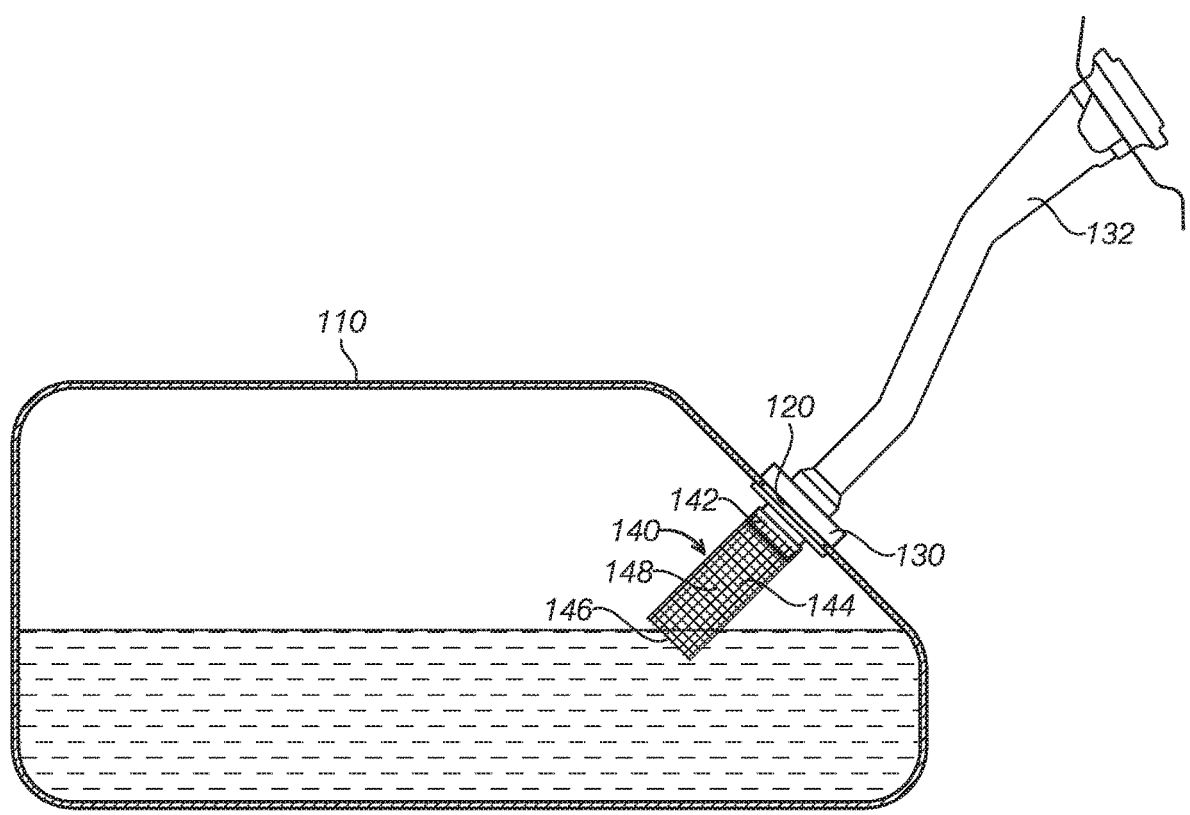
FIG. 2A schematically illustrates an example vapor suppression device installed in a fuel tank according to one embodiment of the present disclosure.
Figure 2B:
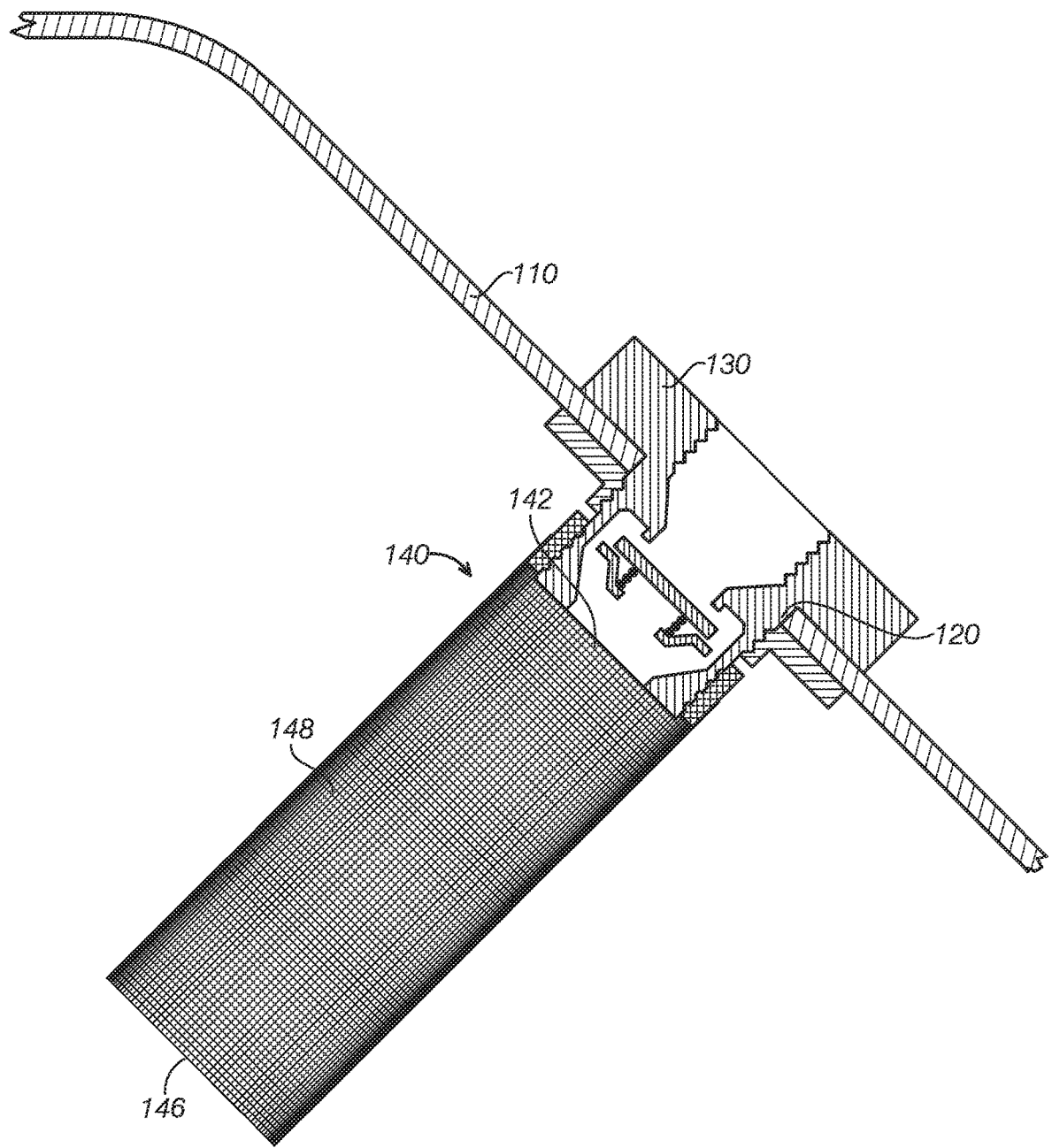
FIG. 2B shows an enlarged view of the vapor suppression device in FIG. 2A.

FIGS. 2A and 2B schematically illustrate an example fuel tank 100 in a vehicle. Fuel tank 100 includes a fuel storage compartment 110 with an opening 120, an inlet check valve 130, and vapor suppression device 140 disposed in fuel storage compartment 110. Inlet check valve 130, disposed in opening 120, is connected to a fuel filler pipe 132. When a user pumps fuel into the storage compartment, the fuel passes through fuel filler pipe 132 and inlet check valve 130 which prevents the fuel to flow back to the fuel filler 132. Fuel vapor suppression device 140 may include a mesh portion configured to dissipate the energy of the incoming fuel and reduce the spray effect as the fuel exits the inlet check valve while preventing blocking due to accumulation of particles and other contaminants on the vapor suppression device that might cause reduction of fuel flow at a maximum flow rate.

Continuing with FIGS. 2A and 2B, the fuel vapor suppression device 140 includes an inlet end 142, a body 144, and an outlet end 146. In some embodiments, body 144 may include a hollow cylindrical body with a mesh portion 148. In the depicted embodiment, body 144 is a round cylinder, but it can be any appropriate cylindrical shape such as a cylindrical body having an oval shaped cross section. Inlet end 142 may be coupled to inlet check valve 130 via any appropriate mechanisms. Outlet end 146 is disposed spaced away from a bottom of fuel storage compartment 110. In some embodiments, body 144 may be made of plastic. However, it may be made of any suitable material including, for example, stainless steel. Mesh portion 148, which forms sidewalls of body 144 is configured to dissipate the energy of the incoming fuel to reduce vapor production while allowing fuel to free flow through without undesired restriction. The dimension of pore size, the configuration and the location of the cylindrical body are among the factors to determine the effect of fuel vapor reduction and desired flow rate. In some embodiments, mesh portion 148 has a pore size no less than 1 millimeter (mm). The pore size of no less than 1 mm can allow fuel flowing through the cylindrical body without limiting the maximum flow rate. The pore size may be in a range of about 1.0 mm to about 1.5 mm, in which the value may refer to a diameter of a circular pore, a side of a square pore, or a longer side of a rectangular pore. It should be understood that the pores of mesh portion 148 may be any suitable shapes such as rectangular, circular, triangular, or polygon. In the example depicted in FIGS. 2A and 2B, the pores of the mesh portion are substantially the same.

Figure 5:
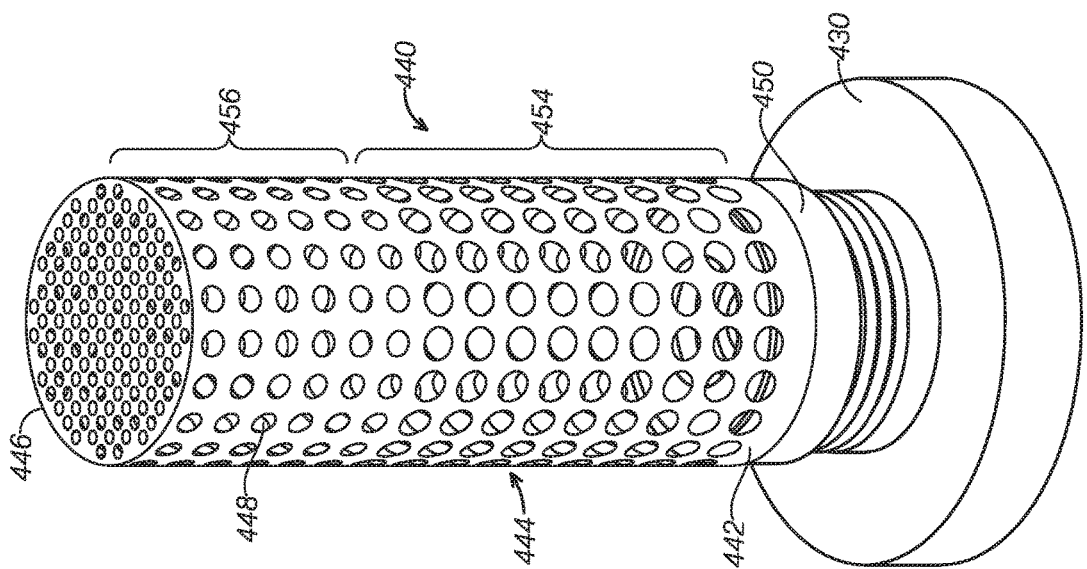
FIG. 5 is a perspective view of an example vapor suppression device according to another embodiment of the present disclosure.

Vapor suppression device 140 may be connected to inlet check valve 130 by any suitable approach. For example, vapor suppression device 140 may include a collar, such as shown in FIG. 5 in relation to vapor suppression device 440, to be connected to inlet check valve 130 via snap-fitting. In another example, fuel vapor suppression device 140 may be connected to inlet check valve 130 by a tie such as a plastic tie as shown in FIG. 4 in relation to vapor suppression device 340.

The vapor suppression device 140 may be any length, including in a range of about 100 mm and about 150 mm depending on the size and configuration of the fuel tank. In some embodiments, the length of the cylindrical body may be no greater than a half height of the fuel tank. In some embodiments, a portion of body 144 adjacent to outlet end 146 may be submerged in the fuel as fuel is filled above outlet end 146. It should be understood that outlet end 146 is not required to be floated on a fuel level.

Figure 3:
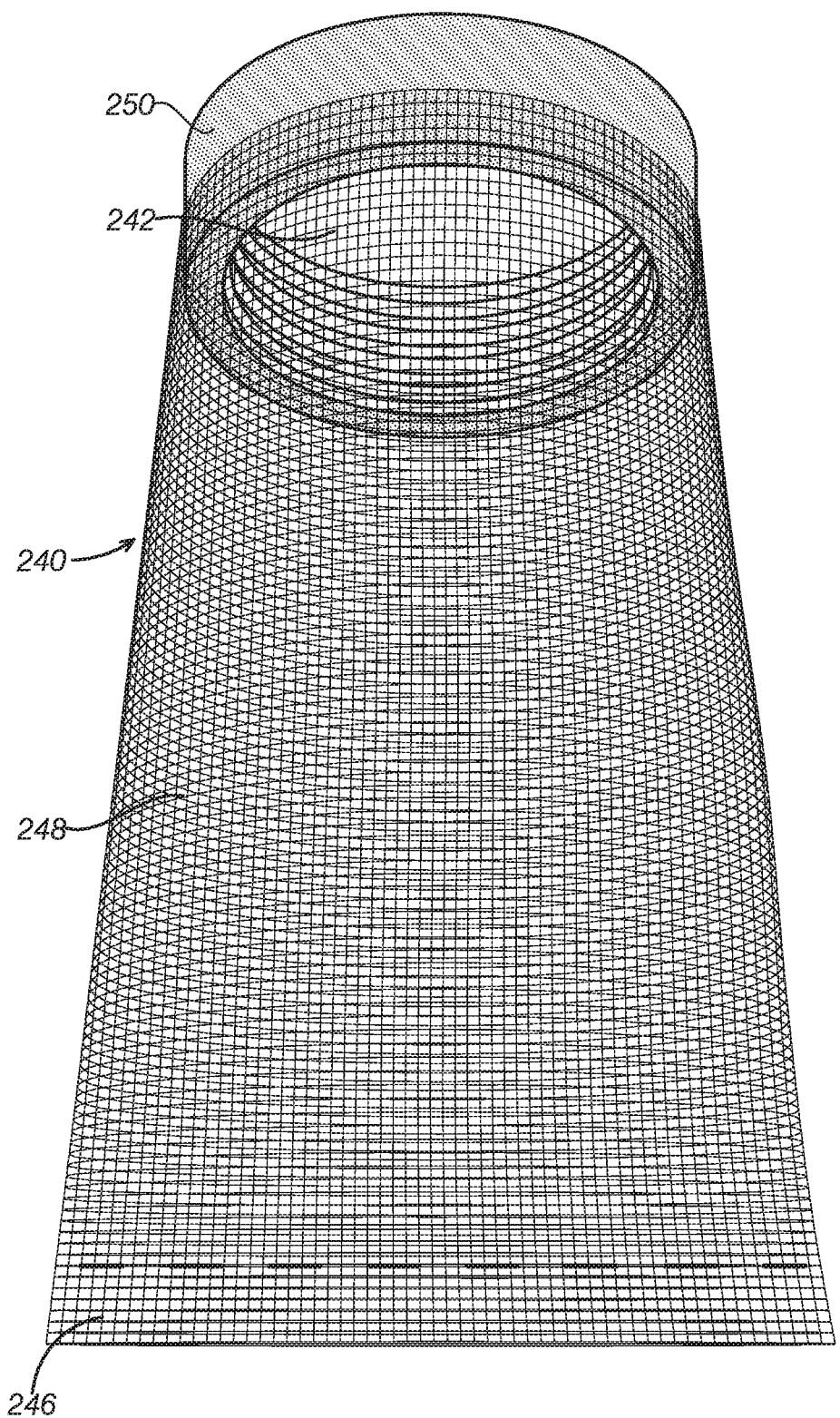
FIG. 3 is a perspective view of an example vapor suppression device according to another embodiment of the present disclosure.

FIG. 3 shows a perspective view of a vapor suppression device 240 according to another embodiment of the present disclosure. In the depicted embodiment, vapor suppression device 240 includes an inlet end 242, an outlet end 246 and a cylindrical body 248. A collar 250 allows the device to couple to a body of an inlet check valve by snap-fit. Cylindrical body 248 is formed from mesh material such as plastic mesh or metal mesh. In the depicted embodiment, the sidewall of cylindrical body 248 is closed off at the outlet end 246, that is, one end of sidewall is sealed or pinched together. In this configuration, a cross-sectional area of cylindrical body 248 becomes decreased along a path of the fuel entering the fuel tank. As a result, the kinetic energy increases and more energy is dissipated as the fuel passes the vapor depression device 240. Due to consumption of the energy, the vaporization of the fuel is reduced. At the same time, the free flow is allowed as the pore mesh is sized no less than 1 mm.

Figure 4:
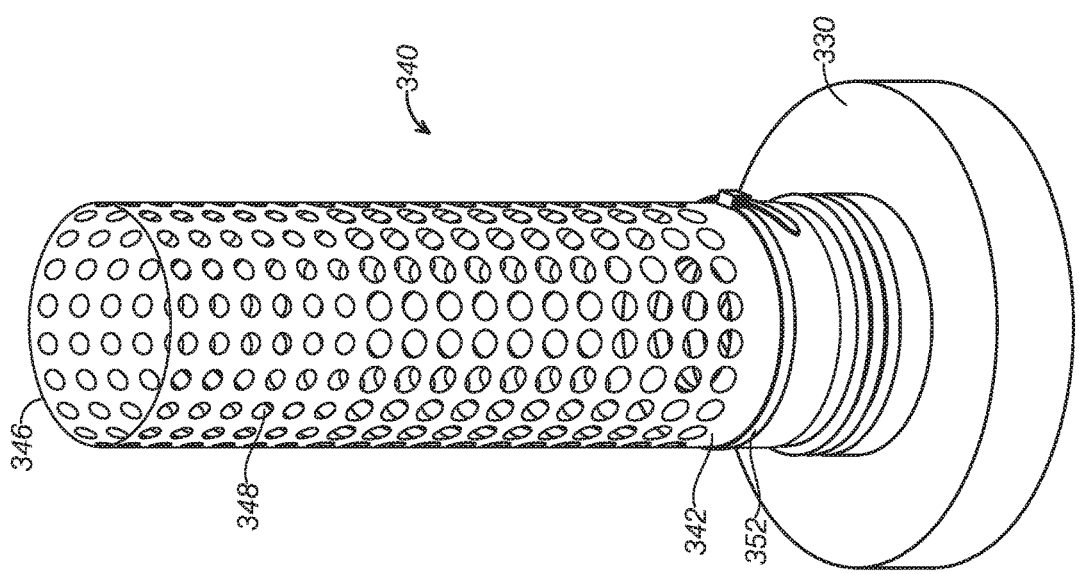
FIG. 4 is a perspective view of an example vapor suppression device according to another embodiment of the present disclosure.

FIG. 4 shows another embodiment of a vapor suppression device 340. Vapor suppression device 340 includes an inlet end 352, an outlet end 354, and a cylindrical body 348 defined by a sidewall 350 and a bottom wall 352. Plastic tie 352 allows vapor suppression device 340 to couple to a body of an inlet check valve according to means well known in the art. Bottom wall 352 may have smaller pores than that of sidewall 350. Smaller pores can reduce vapor production more effectively due to more energy dissipation due to resistance on the flow while larger pores on sidewall 350 permit free flow through vapor suppression device 340. Cylindrical body 348 may be made from hard plastic material or soft plastic material. Pores may be formed by any appropriate approach, such as drilling holes, punching holes, forming holes in a molding process, for example. In some embodiments, cylindrical body 348 may be made from mesh material having different pore sizes.

FIG. 4 also shows that cylindrical body 348 is connected to inlet check valve 330 by a tie 352. It should be appreciated that any suitable approaches can be used for connecting vapor suppression device 340 to inlet check valve 330.

FIG. 5 shows another embodiment of a vapor suppression device 440. Vapor suppression device 440 includes an inlet end 442, an outlet end 446, and a cylindrical body 448 defined by a sidewall 450 and a bottom wall 452 and configured to have pores on sidewall 450 and/or a bottom wall 452. Collar 450 allows vapor suppression device 440 to couple to a body of an inlet check valve by snap-fit. Sidewall 450 may include a first portion 454 having a first pore size and a second portion 456 having a second pore size. First portion 454 is adjacent to inlet end 442. The first pore size in first portion 354 may be greater than the second pore size of second portion 456. In the depicted embodiment, bottom wall 452 may include pores and have a third pore size. In some embodiments, third pore size may be smaller, greater or have the same size as the second pore size. In other examples, the third pore size may be smaller, greater or have the same size as the first pore size. Cylindrical body 448 may be made from hard plastic material or soft plastic material. Pores may be formed by any appropriate approach, such as drilling holes, punching holes, forming holes in a molding process, for example. In some embodiments, cylindrical body 448 may be made from mesh material having different pore sizes.

It should be appreciated that the pore size at different portions of the cylindrical body 348 may vary depend on the configuration of the fuel tank to achieve the effects of fuel vapor reduction while maintaining free flow of the fuel out of the cylindrical body.

Figure 6:
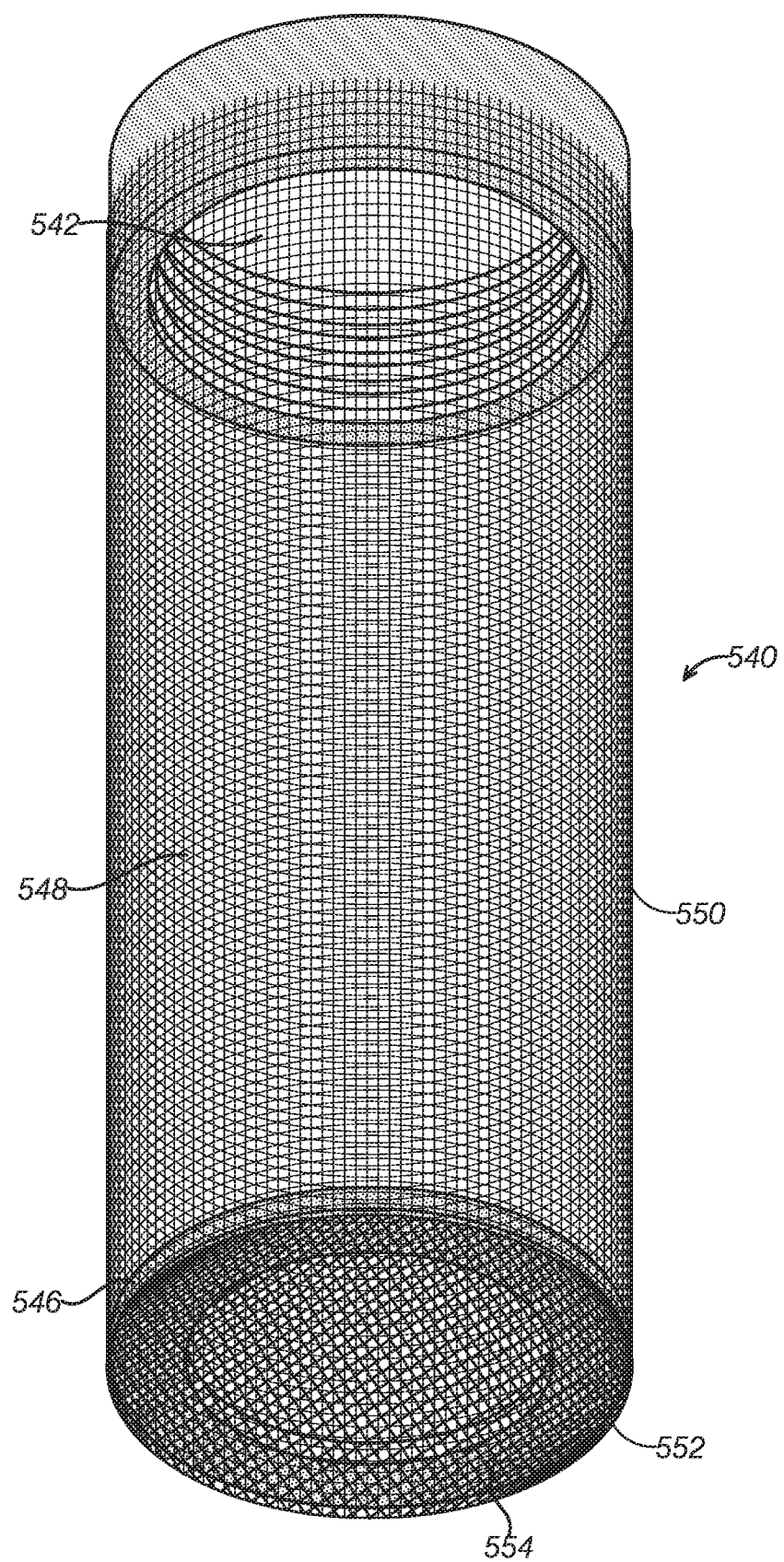
FIG. 6 is a perspective view of an example vapor suppression device according to another embodiment of the present disclosure.

FIG. 6 shows another embodiment of a vapor suppression device 540 according to the present disclosure. For the sake of brevity, features similar to the previous embodiments will not be described in detail. Vapor suppression device 540 includes an inlet end 542, an outlet end 546 and a cylindrical body 548 defined by a sidewall 550 and a bottom wall 552. The configuration of cylindrical body 548, pore size and shape may be similar to the embodiments described above. The difference is that a magnetic ring 554 may be attached to bottom wall 552. Magnetic ring 554 can capture fine particles having ferrous properties that otherwise would escape vapor suppression device 540 due to their small size. In this way, vapor suppression device 540 can have the additional function of capturing fine particles via magnetic force in addition to filtering out particles having sizes greater than that of the pore size of vapor suppression device 540.

Figure 7:
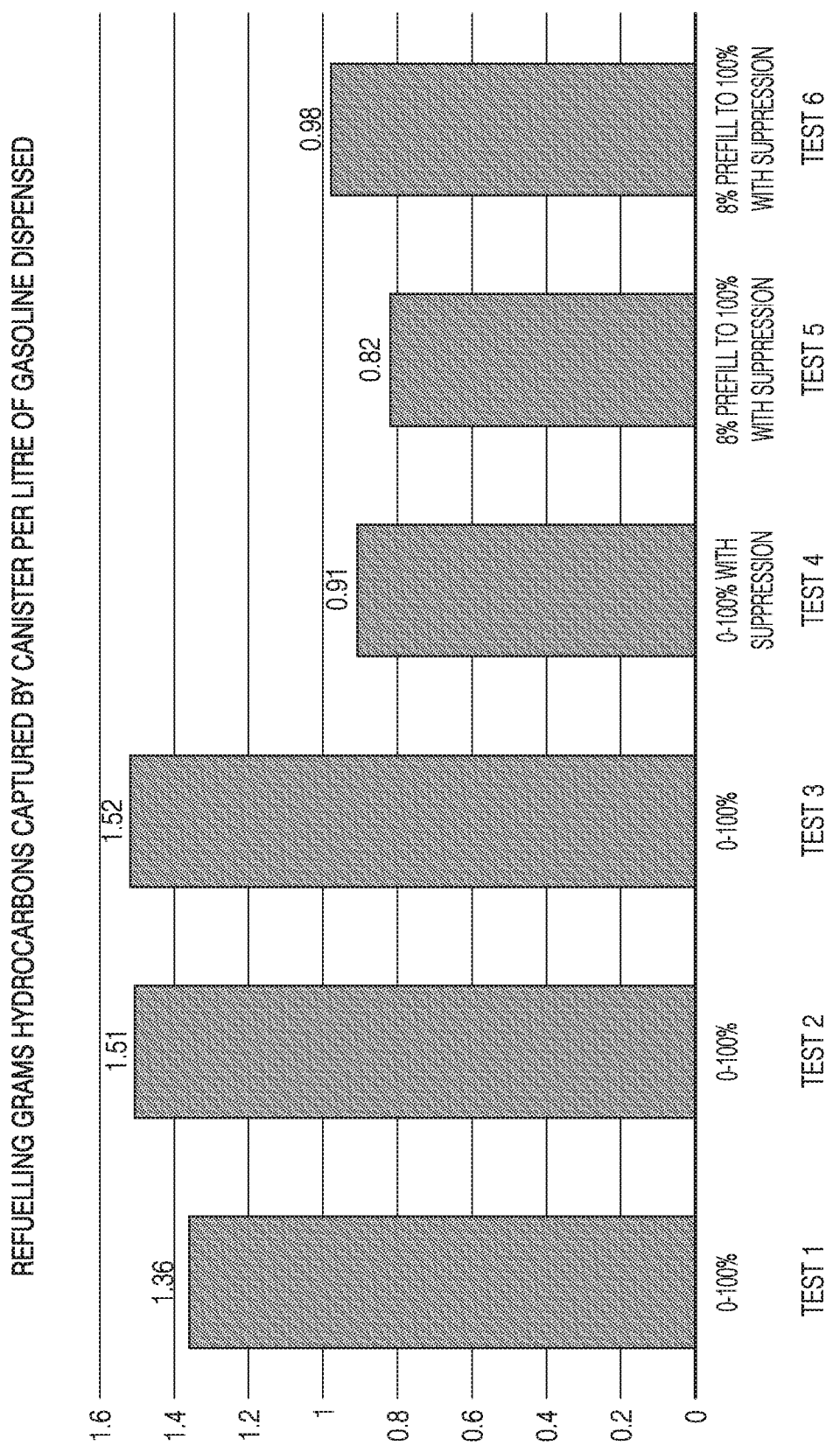
FIG. 7 are test data showing hydrocarbon adsorption in a canister of a fuel system having a fuel tank installed with a vapor suppression device and a fuel tank without the vapor suppression device.

The fuel vapor suppression device of the present disclosure can significantly reduce vapor production during refueling. FIG. 7 illustrates test results showing hydrocarbons captured by a canister in a vehicle fuel system as illustrated in FIG. 1. During the tests, the vapour loading to the canister was 38 liters per minute. The fuel tank used in the tests had an internal volume capacity of 80 liters. The vapor suppression device used in the test included a cylindrical body with a length of 120 mm long with a mesh portion, an internal diameter of 39 mm, and pores of 1.3 mm×1.3 mm in the mesh portion. The cylindrical body was closed off at an outlet end. An inlet end of the cylindrical body was coupled to an inlet check valve. Fuel was pumped at rate of 38 liters per minute. The ambient temperature was between 15 and 18 degrees C. during the tests. The vapor loading to the canister in the fuel system was determined and presented in FIG. 6. The amount of hydrocarbons (gram) captured by the canister per liter of gasoline dispensed is shown in FIG. 7. Tests 1-4 were completed from zero to 100% fill in one operation. Tests 4-6 were conducted at the tank where the refueling started when the fuel tank was 8% full and ended when the fuel tank was 100% fuel. Tests 1-3 were conducted in the fuel tank without the vapor suppression device. Tests 3-6 were conducted at the tank equipped with the vapor suppression device.

In the operation during which the tank was refueled from 0 to 100% capacity, vapor adsorbed in the canister in the fuel tank having the vapor suppression device was reduced by approximately 36% compared to the fuel tank without the vapor suppression device. In the operation during which the tank was refueled from 8% to 100% capacity, vapor adsorbed in the canister was reduced by approximately 40% in the fuel tank having the vapor suppression device compared to the fuel tank without the vapor suppression device. The test data indicate that the vapor entering the canister is significantly reduced by using the vapor suppression device of the present disclosure. The reduction of the vapor can allow a higher percentage of lower BAX rating carbon to be included in the canister, which improves bleed emissions performance and saves the cost for the canister.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A fuel tank in a vehicle, comprising:
   a fuel storage compartment;
   an opening;
   an inlet check valve disposed on the opening and connected to a fuel filler pipe; and
   a vapor suppression device disposed in the fuel tank, wherein the vapor suppression device includes an inlet end coupled to the inlet check valve, an outlet end, and a hollow cylindrical body between the inlet end and the outlet end and including a mesh portion, wherein the outlet end is spaced apart from a bottom of the fuel tank, and the mesh portion has pore size no less than 1 mm;
   wherein the vapor suppression device further comprises a magnetic ring coupled with the hollow cylindrical body.

2. The fuel tank of claim 1, wherein sizes of pores of the mesh portion of the cylindrical body is in a range of about 1.0 to 1.5 mm.

3. The fuel tank of claim 1, wherein a length of the vapor suppression device is in a range of about 100 mm and 150 mm.

4. The fuel tank of claim 1, wherein the inlet end includes a collar to be snap-fit to a body of the inlet check valve or the inlet end is coupled to the inlet check valve by a plastic tie strap.

5. The fuel tank of claim 1, wherein the hollow cylindrical body is closed off at the outlet end.

6. The fuel tank of claim 1, wherein the hollow cylindrical body includes a sidewall and a bottom wall, and wherein the mesh portion includes a first mesh on the sidewall and a second mesh on the bottom wall.

7. The fuel tank of claim 6, wherein the magnetic ring is coupled to the bottom wall.

8. A vapor suppression device disposed in a fuel tank comprising:
   an inlet end configured to couple on a fuel inlet check valve;
   an outlet end; and
   a hollow cylindrical body, wherein the hollow cylindrical body includes a mesh portion and the outlet end is spaced apart from a bottom of the fuel tank and sizes of pores of the mesh portion of the cylindrical body is no less than 1 mm;
   wherein the cylindrical body includes a sidewall and a bottom wall at the outlet end, and the sidewall includes a first mesh and the bottom wall includes a second mesh; and
   wherein a pore size of the first mesh of the sidewall is greater than a pore size of the second mesh of bottom wall.

9. The vapor suppression device of claim 8, wherein thickness of the mesh portion of the cylindrical body is about 0.3 mm.

10. The vapor suppression device of claim 8, wherein sizes of pores of the mesh portion of the cylindrical body is in a range of about 1.0 mm to 1.5 mm.

11. The vapor suppression device of claim 8, wherein a length of the vapor suppression system is in a range of about 100 mm and 150 mm.

12. The vapor suppression device of claim 8, wherein the inlet end includes a collar to be snap-fit to a body of the inlet check valve.

13. The vapor suppression device of claim 8, wherein the vapor suppression system is made from plastic material.

14. The vapor suppression device of claim 8, further comprising a magnetic ring coupled to the bottom wall.

15. A fuel tank in a vehicle, comprising:
   an inlet check valve disposed on an opening of an opening of the fuel tank and connected to a fuel filler pipe; and
   a vapor suppression device disposed in the fuel tank, wherein the vapor suppression device includes an inlet end coupled to the inlet check valve, an outlet end, and a mesh cylindrical body including a sidewall, wherein the outlet end of the sidewall is pinched together;
   wherein the outlet end of the vapor suppression device is spaced apart from a bottom of the fuel tank.

16. The fuel tank of claim 15, wherein at least a portion of the mesh cylinder body has pore size no less than 1 mm.

17. The fuel tank of claim 15, wherein the pore of the mesh cylindrical body is of substantially square shape.

18. The fuel tank of claim 15, wherein the vapor suppression device includes a magnetic ring coupled to the mesh cylindrical body.

19. The fuel tank of claim 15, wherein the vapor suppression system is made from plastic material or metallic material.

* * * * *